Sept. 23, 1947. O. A. KEHLE 2,427,789
HIGH PRESSURE SEAL
Filed Feb. 15, 1945
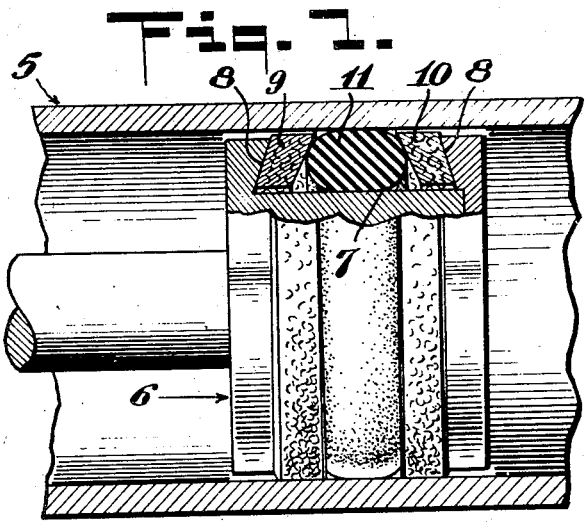
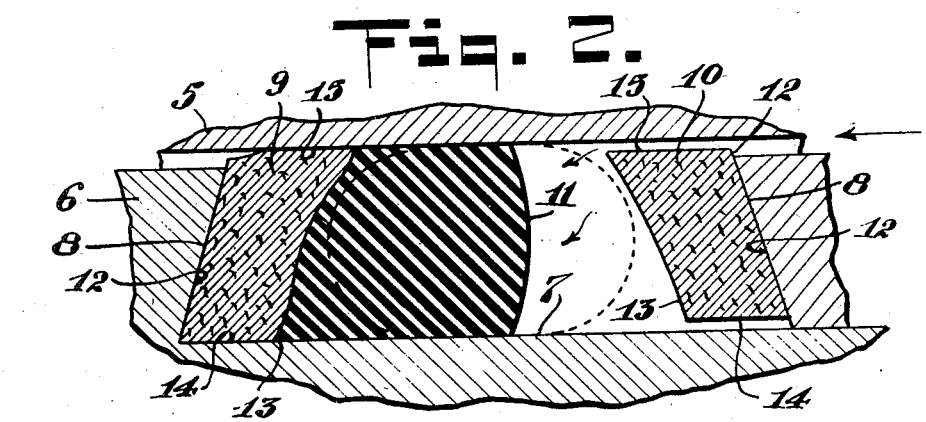
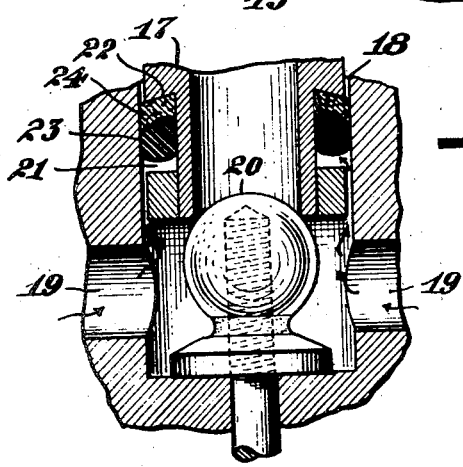
Inventor
OTTMAR A. KEHLE
By R. S. Berry
Attorney Patented Sept. 23, 1947

2,427,789

UNITED STATES PATENT OFFICE 2,427,789

HIGH-PRESSURE SEAL

Ottmar A. Kehle, Van Nuys, Calif., assignor to Adel Precision Products Corp., a corporation of California Application February 15, 1945, Serial No. 578,001

7 Claims. (Cl. 309—23)

This invention relates to means for sealing pistons, piston-like members and valves, particularly in high pressure hydraulic systems as used to actuate and control component mechanisms and devices in aircraft.

The primary object of this invention is to provide a novel sealing means of the character described for use in hydraulic systems operating under extremely high pressures of the order of from 1500 to 5,000 pounds per square inch, which means will create and maintain under the pressure to which it is subjected and regardless of extreme temperature variations, a most effective and reliable leak-proof seal without imposing an objectionable friction load on and interfering with the desired movement of the piston or similar member to which the seal is applied or causing objectionable extrusion and undue wear of the sealing means.

A further object of this invention is to provide a sealing means such as described in which a soft rubber or soft synthetic rubber sealing ring and a backing or extrusion-preventing gasket, together with a ring groove therefor, are constructed and arranged in a particular manner so that a controlled but most effective sealing action affording the advantages herein noted is brought about responsive to the pressure of the operating fluid in a particularly reliable and efficacious manner.

Another object is to provide a sealing means such as described wherein the objects hereof are primarily attained by reason of a construction and arrangement of the ring groove and the backing gasket which construction and arrangement causes the backing ring to have a limited and controlled movement axially of the groove under the pressure of the sealing ring thereagainst in order to control the compression and extrusion action of the sealing ring and confine the latter to the groove so as to assure an effective seal without an objectionable friction load and resultant wear on the ring and gasket.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary sectional view of a seal embodying the present invention as applied to a piston;

of the backing or extrusion-preventing gaskets and the sealing ring when effecting a seal between the cylinder and piston while the latter is moved in one direction;

Fig. 3 is a fragmentary sectional view of the sealing ring;

Fig. 4 is a fragmentary vertical sectional view of a modified form of the sealing means hereof as applied to a valve member which is moved in one direction only by fluid pressure.

Referring to the drawing more specifically 5 designates a cylinder and 6 a piston to which latter the sealing means of my invention is applied, said piston being adapted to be moved responsive to fluid pressure applied to opposite ends thereof as is typical of reciprocating members employed in high pressure hydraulic systems for actuating the component devices and mechanisms in aircraft.

In accordance with my invention the piston 6 is provided with a circumferential seal-receiving groove having a bottom wall 7 and side walls 8 which latter are inclined and converge toward the open side of the groove to serve as seating surfaces for two extrusion-preventing gaskets 9 and 10 between which a sealing ring 11 is disposed.

The gaskets 9 and 10 are made of yieldable and compressible material which will not be appreciably affected by extremes in temperature, for example, leather, and are comparatively thick and generally of trapezoidal shape in cross section. The outer face 12 of each gasket is inclined in correspondence to the inclination of the adjacent side wall 8 on which it seats. The inner face 13 of each gasket is more sharply inclined than the outer face 12 and therefore out of parallelism with face 12. Therefore the inner peripheral face or edge 14 of each gasket is narrower than the outer peripheral face or edge 15 which latter is disposed out of the groove for sealing contact with the cylinder 5. This formation of the gaskets provides a greater mass of material at the outer periphery of the gasket and also makes for a controlled and limited movement and action thereof to prevent extrusion of the sealing ring without setting up an objectionable friction load as will be hereinafter more fully described.

The sealing ring 11 is made of soft elastic material such as rubber or synthetic rubber and is normally substantially circular in cross section but when installed, as shown in Fig. 3, is compressed between the cylinder 6 and the bottom sharply inclined faces 13 of the gaskets 9 and 10 at points intermediate the inner and outer edge faces 14 and 15 thereof.

When fluid under pressure is directed against the piston 6, for example, to move it to the left of the position shown in Fig. 1, and in the direction indicated by the arrows in Fig. 2, the sealing ring and gasket 9 to the left thereof assume the approximate positions shown in Fig. 2. In this connection it should be noted that the clearances shown between the inner and outer edges 14 and 15 of the gaskets and the bottom wall 7 and cylinder 6 respectively are exaggerated to best illustrate the action of the gaskets and sealing ring when subjected to pressure in being disposed in sealing position.

Referring specifically to Fig. 2 it is seen that when the fluid pressure is applied in the direction of the arrows it is effective past the gasket 10 against the soft sealing ring 11 which latter is then compressed and deformed by this pressure so that it in turn compresses the gasket and comes into contact with the entire area of the inner face 13 of said gasket exerting more pressure approximately centrally of the edges of said inner face and forming a slight concavity at that point.

It is important to note that due to inclination of the inner face 13 of gasket 9, the sealing ring 11, when being compressed and deformed under the pressure of the operating fluid, will exert a force against said inner face such that the gasket is forced outwardly by the resultant cam action, in a direction away from the bottom 7 of the groove. This force is, however, counteracted somewhat by the inclined or convergent side wall 8 with the result that the material of the gasket is caused to "flow" or "squeeze" outwardly against the cylinder wall while the gasket has but a very small bodily displacement axially of the groove. Thus the material of the gasket is displaced against the cylinder in tighter contact therewith at a point near to the inner face 13 than to the outer face 12 thereof and therefore positively prevents extrusion of the relatively soft material of the sealing ring between the cylinder wall and said gasket. At the same time, the compressed and deformed sealing ring is closely engaged with the bottom 7 of the groove, the entire area of the face 13 and the cylinder 6 thus forming an effective seal at these three points. The gasket 9 forms an additional seal with the walls 7 and 8 and the cylinder.

When fluid is directed to operate the piston in the opposite direction, the gasket 10 and ring 11 operate in the same manner as gasket 9 and ring 10 to provide and maintain an effective seal.

It is now apparent that in having an extrusion-preventing gasket of trapezoidal form in cross section arranged as here shown to seat against a convergent side wall of a seal-receiving groove, with the sealing ring bearing against the more abruptly inclined inner face of the gasket, a most effective and reliable seal is provided with a controlled and limited action of the gasket and ring whereby objectionable friction loads and the disadvantages attendant thereon are positively eliminated.

Fig. 4 shows a modified form of the seal hereof as applied to a tubular piston-like valve member 17 which is moved in one direction only in a bore 18 by means of fluid under pressure applied through ports 19 to raise the valve from its seat 20. In this form of my seal the valve member 17 has a groove 21 in which only one side wall 22 is inclined to extend convergently toward the open side of the groove. A sealing ring 23 identical with the ring 11 and a single gasket 24 identical with the gaskets 9 and 10 are mounted in the groove 21 and operate in the same manner as the seal shown in Figs. 1 and 2 when the valve is unseated. It will be appreciated that so long as the pressure applied to the relief valve remains below the point at which it will open, the sealing means operates as a static seal and that therefore the usefulness of the invention is not limited to the formation of a seal between parts having a relative movement.

It is important to note that the gaskets are thicker at their outer peripheries and gradually decrease in thickness toward their inner peripheries, whereby the controlled displacement thereof is beter provided for and the greater mass of material thereof is disposed to assure an effective sealing and extrusion-preventing action.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a sealing means adapted to be mounted in a groove of a piston-like member for operation in a bore or cylinder to which is applied a fluid under high pressure, a sealing ring of soft elastic rubber or like material adapted to be mounted in said groove, and a compressible gasket of leather or the like adapted to be mounted in said groove so that it will lie between a side wall of the groove and said ring, said side wall being converged towards the open side of the groove so that it will restrict bodily movement of the gasket outwardly from the groove, said gasket having the inner face opposed to the ring inclined out of parallelism with the face which engages said side wall whereby when the ring is forced by fluid pressure against said gasket, there will be provided a cam action tending to force the gasket bodily outward away from the bottom of the groove.

2. In a sealing means adapted to be mounted in a groove of a piston-like member for operation in a bore or cylinder to which is applied a fluid under high pressure, a sealing ring of soft elastic rubber or like material adapted to be mounted in said groove, and a compressible gasket of leather or the like adapted to be mounted in said groove so that it will lie between a side wall of the groove and said ring, said side wall being converged towards the open side of the groove so that it will restrict bodily movement of the gasket outwardly from the groove, said gasket being substantially trapezoidal in cross section with the faces which are out of parallelism disposed in contact with said side wall and said ring respectively; the face of said gasket adjacent the bottom of said groove being of less width than the opposite face.

3. A piston-like member adapted for a working fit in a bore or cylinder and having a circumferential seal-receiving groove a side wall of which converges toward the entrance of the groove, a compressible elastic sealing ring mounted in said groove and being of substantially circular cross section, and an annular compressible gasket mounted in said groove so as to seat against said converging side wall with its inner periphery in contact with the bottom of the groove and its outer periphery extended from said groove for contact with the wall of the bore or cylinder in which said piston-like member is operable, said gasket being of trapezoidal cross section with the faces thereof which are out of parallelism in contact with the side wall of the groove and said ring respectively; the face of said gasket adjacent the bottom of said groove being of less width than the opposite face.

4. A piston-like member adapted to have a working fit in a bore or cylinder and having a circumferential seal-receiving groove the side walls of which converge toward the entrance of the groove, a compressible elastic sealing ring mounted in the groove and being of substantially the same diameter in directions both axially and transversely of the groove with its inner and outer peripheries adapted to contact the bottom of the groove and the wall of the bore or cylinder, respectively and annular compressible gaskets interposed between said side walls and said sealing ring with their inner peripheries disposed to contact the bottom of the groove and their outer peripheries disposed to contact said wall of said bore or cylinder, said gaskets acting to prevent flow of the material of said ring between the piston-like member and said wall of said bore or cylinder, said converging side walls of the groove acting to restrict the bodily movement of said gaskets axially of said groove, said sealing ring being subject to compression by pressure of fluid directed in either direction against the piston-like member and operating when compressed to compress one of said gaskets to displace the material thereof into sealing contact with walls of said groove and said wall of said bore or cylinder, said gaskets having their ring contacting faces inclined out of parallelism with their side wall engaging faces and disposed to provide a cam action when abutted by the ring whereby the gaskets tend to move outwardly from said bottom wall.

5. A piston-like member adapted to have a working fit in a bore or cylinder and having a circumferential seal-receiving groove the side walls of which converge toward the entrance of the groove, a compressible elastic sealing ring mounted in the groove and being of substantially the same diameter in directions both axially and transversely of the groove with its inner and outer peripheries adapted to contact the bottom of the groove and the wall of the bore or cylinder, respectively, and annular compressible gaskets interposed between said side walls and said sealing ring with their inner peripheries disposed to contact the bottom of the groove and their outer peripheries disposed to contact said wall of said bore or cylinder, said gaskets acting to prevent flow of the material of said ring between the piston-like member and said wall of said bore or cylinder, said converging side walls of the groove acting to restrict the bodily movement of said gaskets axially of said groove, said sealing ring being subject to compression by pressure of fluid directed in either direction against the piston-like member and operating when compressed to compress one of said gaskets to displace the material thereof into sealing contact with walls of said groove and said wall of said bore or cylinder, said gasket having greater thickness at its outer peripheral portion and gradually decreasing in thickness toward its inner periphery.

6. A piston-like member adapted to have a working fit in a bore or cylinder and having a circumferential seal-receiving groove a side wall of which converges toward the entrance of the groove, a compressible elastic sealing ring of substantially the same diameter in directions both axially and transversely of the groove without the inner and outer peripheries thereof adapted to engage the bottom of the groove and the wall of the bore or cylinder respectively, and an annular compressible gasket mounted in said groove so as to seat against said converging side wall on one face and against said ring on its other face, with its inner periphery disposed to contact the bottom of the groove and its outer periphery disposed to contact the wall of said bore or cylinder, said gasket being of greater thickness at its outer periphery and gradually decreasing in thickness towards its inner periphery.

7. In hydraulic apparatus including a pair of circular elements disposed one within the other, one of said elements having a circumferential groove at a point opposite the other element with resultant formation of an annular channel, the provision of pressure-responsive sealing means comprising a gasket member of compressible material disposed in said groove at the side thereof remote from the point of application of hydraulic pressure, a resilient sealing ring in said groove, engageable with the exposed side face of said gasket, said ring being of such cross sectional dimension as to contact the bottom of said groove and the face of the other element, the adjacent faces of said groove and said gasket being parallel and extending toward the open side of said groove at an acute angle and the opposite side face of said gasket extending toward the open side of said groove at a more acute angle than that formed by said side of said groove.

OTTMAR A. KEHLE.

REFERENCES CITED

The following references are of record in the file of this patent:

UNITED STATES PATENTS

| Number | Name | Date |
| --- | --- | --- |
| 2,180,795 | Christensen | Nov. 21, 1939 |
| 2,188,957 | Pfanser | Feb. 6, 1940 |
| 1,612,038 | Miller | Dec. 28, 1926 |
| 2,042,078 | Shum | May 26, 1936 |
| 2,349,170 | Jackman | May 16, 1944 |
| 2,306,800 | Caldwell | Dec. 29, 1942 |
| 756,880 | McIntire | Apr. 12, 1904 |
| 2,232,293 | Toennies | Feb. 18, 1941 |
| 2,081,040 | King | May 18, 1937 |